US012321868B1

(12) United States Patent
Sugathan et al.

(10) Patent No.: US 12,321,868 B1
(45) Date of Patent: Jun. 3, 2025

(54) FULFILLING REQUESTS THROUGH A REGISTRY OF VIRTUAL AGENTS

(71) Applicant: American Express Travel Related Services Company, Inc., New York, NY (US)

(72) Inventors: Man Mohan Sugathan, Phoenix, AZ (US); Deepanshu Bhatia, Phoenix, AZ (US); Andrew J. Trujillo, Phoenix, AZ (US); Dirk White, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 719 days.

(21) Appl. No.: 17/514,483

(22) Filed: Oct. 29, 2021

(51) Int. Cl.
*G06N 5/043* (2023.01)
*G06F 40/216* (2020.01)
*G06F 40/40* (2020.01)

(52) U.S. Cl.
CPC ........... *G06N 5/043* (2013.01); *G06F 40/216* (2020.01); *G06F 40/40* (2020.01)

(58) Field of Classification Search
CPC ........ G06N 5/043; G06F 40/216; G06F 40/40
See application file for complete search history.

(56) References Cited

U.S. PATENT DOCUMENTS

| | | | |
|---|---|---|---|
| 2018/0054464 A1* | 2/2018 | Zhang | H04L 51/02 |
| 2019/0243899 A1* | 8/2019 | Yi | G06F 16/00 |
| 2019/0266280 A1* | 8/2019 | Acampado | G06F 8/60 |
| 2020/0302020 A1* | 9/2020 | Abu Asba | G06F 40/295 |
| 2022/0129642 A1* | 4/2022 | Mohanty | G06N 3/08 |

FOREIGN PATENT DOCUMENTS

CA 3132401 A1 * 9/2020 ........... G06F 13/102

* cited by examiner

*Primary Examiner* — Edwin S Leland, III
(74) *Attorney, Agent, or Firm* — Thomas Horstemeyer, LLP

(57) ABSTRACT

Disclosed are various embodiments for fulfilling requests through a registry of virtual agents. A request can be received from a first virtual agent. An intent corresponding to the request can be identified, and a second virtual agent associated with the intent can be identified. An identifier for of the second virtual agent can be provided to the first virtual agent.

19 Claims, 6 Drawing Sheets

FULFILLING REQUESTS THROUGH A REGISTRY OF VIRTUAL AGENTS

BACKGROUND

Virtual agents can perform many useful functions when users submit requests to those virtual agents. For example, a user can provide a question or a command to a virtual agent. The virtual agent can respond by answering the question or performing a task to effectuate the command. Virtual agents often can assist users with particular types of requests by performing specialized functions using specific sets of skills.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for fulfilling requests through a registry of virtual agents. A virtual agent may only be configured or programmed to handle certain types of requests. Thus, when a user selects a particular virtual agent to which to submit a request, the user may be unaware of whether the virtual agent can fulfill the request. If the virtual agent is incapable of fulfilling the user's request and provides the user with an error message or other such notification, the user may be unsure of what further steps to take. While the user could attempt to identify a virtual agent that is capable of fulfilling the user's request, this process can be time-consuming. In fact, the user may be unable to find a virtual agent capable of fulfilling the request. This may be especially true if the user cannot determine what types of requests different virtual agents can fulfill. Thus, the user's request may be left unfulfilled.

Embodiments of the present disclosure can address this problem by providing a registry of virtual agents that can be used to direct the user's request to a virtual agent capable of fulfilling the request. For example, a first virtual agent to which the user submits a request may be incapable of fulfilling the user's request. But instead of providing the user with an error message or otherwise notifying the user that the first virtual agent is incapable of fulfilling the request, the first virtual agent can provide the request to the registry of virtual agents. A second virtual agent that is capable of fulfilling the user's request can then be identified from the registry. The user's request can be provided to the second virtual agent, which can then fulfill the request. Depending on the implementation, either the first virtual agent or the second virtual agent can alert the user that the request has been fulfilled. Thus, any particular virtual agent can allow a user's request to be fulfilled, even if the particular virtual agent is itself incapable of fulfilling the request.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
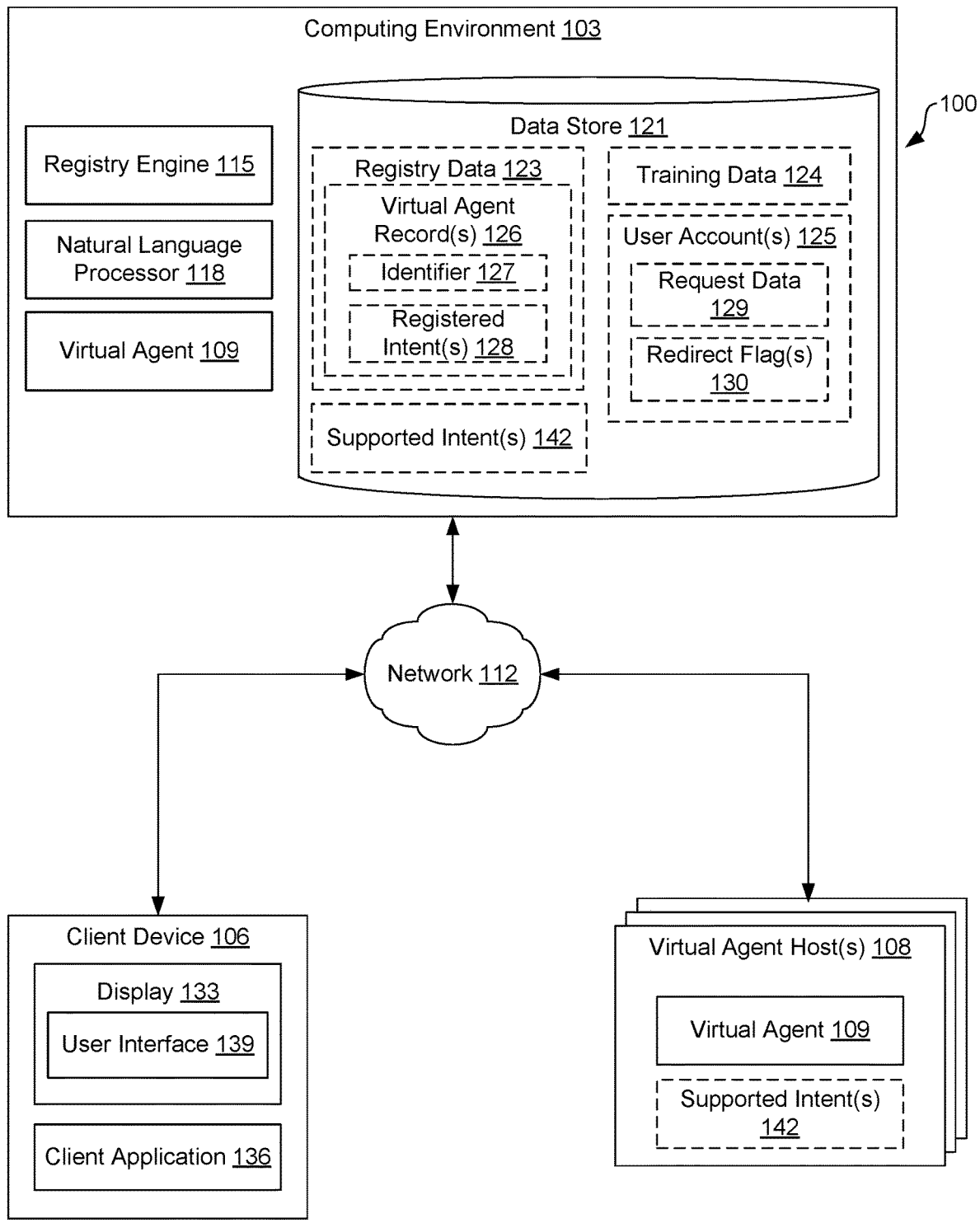
FIG. 1 shows an example of a network environment according to various embodiments of the present disclosure.

With reference to FIG. 1, shown is a network environment 100 according to various embodiments. The network environment 100 can include a computing environment 103, a client device 106, and one or more virtual agent hosts 108, each virtual agent host 108 hosting one or more virtual agents 109, which can be in data communication with each other via a network 112.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 can include a registry engine 115, a natural language processor 118, and other applications, services, processes, systems, engines, or functionality not discussed in detail herein. In some implementations in which one or more virtual agents 109 is hosted on the computing environment 103, the computing environment 103 can also execute the one or more virtual agents 109.

Also, various data can be stored in a data store 121 that is accessible to the computing environment 103. The data store 121 can be representative of one or more data stores 121, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 121 is associated with the operation of the various applications or functional entities described below. This data can include registry data 123, training data 124, user account(s) 125, and potentially other data. For example, one or more supported intents 142 could be stored in the data store 121 or in the computing environment 103 for those implementations where one or more virtual agents 109 are hosted by the computing environment 103. Alternatively, the supported intents 142 could be stored locally with the virtual agent 109 in the computing environment 103, such as on the virtual machine, elastic computing resource, or computing device within the computing environment 103 that is hosting the virtual agent 109.

The registry engine 115 can be executed to handle requests received over the network 112 from one or more virtual agents 109 hosted on one or more respective virtual agent hosts 108. A request can include a command or a question generated by a user of the client device 106. The registry engine 115 can, for example, receive a query including a request from a virtual agent 109. In some instances, this can indicate that the querying virtual agent 109 is itself unable to fulfill the request. In response, the registry engine 115 can identify one or more virtual agents 109 that may be capable of fulfilling the request.

The registry engine 115 can pass a request received from a querying virtual agent 109 to the natural language processor 118. For example, the registry engine 115 can provide the request to the natural language processor 118 by invoking a function call provided by an application programming interface (API) of the natural language processor 118. As another example, the registry engine 115 can store the request in the registry data 123 so that the natural language processor 118 can retrieve the request from that location.

If a request is in a plaintext format or other format compatible with the natural language processor 118, the registry engine 115 can pass the request directly to the natural language processor 118. In some instances, however, a request can include audio data representing a voice command, or other data that is in a format incompatible with the natural language processor 118. In those instances, the registry engine 115 can convert the request to a plaintext format or other format compatible with the natural language processor 118 using a suitable speech-to-text converter before passing the request to the natural language processor 118. The speech-to-text conversion can be based at least in part on, for example, hidden Markov models, artificial neural networks, or dynamic time warping.

The registry engine 115 can receive from the natural language processor 118 an indication of one or more registered intents 128 corresponding to the request. In some implementations, the registry engine 115 can also receive from the natural language processor 118 one or more confidence scores for the one or more registered intents 128. A confidence score can represent a likelihood that a given registered intent 128 matches the request, as discussed in greater detail below.

For a registered intent 128 identified by the natural language processor 118, the registry engine 115 can identify one or more virtual agents 109 registered with the registry engine 115 that support that registered intent 128. For example, the identified registered intent 128 can be compared with the registered intents 128 in each virtual agent record 126 in the registry engine 115. Based at least in part on this comparison, the registry engine 115 can identify any of the intents 128 that match the identified registered intent 128.

In some implementations, the registry engine 115 can determine whether a confidence score associated with a registered intent 128 meets or exceeds a predefined threshold. The confidence score meeting or exceeding the predefined threshold can indicate that the likelihood that a particular virtual agent 109 can fulfill the request is sufficient to provide the request to the other virtual agent 109, instead of notifying the user that the request cannot be fulfilled. For example, the registry engine 115 can determine whether the confidence score meets or exceeds a predefined threshold of ninety percent—indicating ninety percent likelihood that the request matches the registered intent 128—though any other percentage, numerical value, or other type threshold can be used.

In some implementations, the registry engine 115 can identify any virtual agents 109 associated with registered intents 128 that have confidence scores meeting or exceeding the predefined threshold as likely capable of fulfilling the request. In other implementations, however, the registry engine 115 can identify any virtual agents 109 that support the registered intent 128, regardless of whether the confidence scores for the registered intents 128 meet or exceed the predefined threshold.

The registry engine 115 can provide an identifier for one or more identified virtual agents 109 to the querying virtual agent 109 from which the request was initially received. In some implementations, the registry engine 115 can provide an identifier for an identified virtual agent 109 to the querying virtual agent 109 in response to a confidence score for the registered intent 128 meeting or exceeding the predefined threshold. In other implementations, the registry engine 115 can provide a confidence score for the registered intent 128 to the querying virtual agent 109 together with the identifier for the identified virtual agent 109, regardless of whether the confidence score meets or exceeds the predefined threshold.

In some implementations, instead of providing an identifier for an identified virtual agent 109 to the querying virtual agent 109, the registry engine 115 can provide the request to the identified virtual agent 109, which can be hosted on a virtual agent host 108. The registry engine 115 can determine whether to provide the request to the identified virtual agent 109 based at least in part on the confidence score, as discussed above. In some implementations, the registry engine 115 can receive a response to the request from the identified virtual agent 109 and provide that response to the querying virtual agent 109.

The natural language processor 118 can be executed to process a request to determine one or more registered intents 128 that correspond to the request. The natural language processor 118 can employ any suitable natural language processing functionality to parse the request to determine an intent underlying the request and attempt to match that intent with one or more registered intents 128, where each of the registered intents 128 is associated with a virtual agent 109.

For example, the natural language processor 118 can calculate confidence scores for the one or more registered intents 128. A confidence score can represent a likelihood that a registered intent 128 matches the request. If the registered intent 128 matches the request, then the registered intent 128 represents the user's intent underlying the request—that is, what the user intended to accomplish by making the request. The confidence score can be a value within a range of values, where a lower bound of this range indicates a certainty that the request fails to match the registered intent 128, and an upper bound of the range indicates a certainty that the request does match the intent 128. For example, the confidence score can include a percentage value, a numerical value between zero and one or other two boundaries, or another value that represents how closely the request matches the intent 128.

The natural language processor 118 can then return one or more registered intents 128 and their associated confidence scores to the registry engine 115. In some implementations, the natural language processor 118 can return an indication of a registered intent 128 having a highest confidence score to the registry engine 115. In other implementations, the natural language processor 118 can return an indication of all registered intents 128 for which a confidence score was calculated. In still other implementations, the natural language processor 118 can return an indication of any registered intents 128 having confidence scores that meet or exceed a predefined threshold, as discussed above.

The registry data 123 can represent data regarding virtual agents 109 registered with the registry engine 115. This can allow registered intents 128 associated with those virtual agents 109 to be accessible to the registry engine 115 and the natural language processor 118. When a virtual agent 109 is registered with the registry engine 115, a virtual agent record 126 can be created within the registry data 123 that includes information regarding the virtual agent 109. The virtual agent record 126 can include an identifier 127 for the virtual agent 109, one or more registered intents 128 associated with the virtual agent 109, and other information. The identifier 127 for the virtual agent 109 can include, for example, a name, alphanumeric designator, or other designation associated with the virtual agent 109. The registered intent(s) 128 can represent one or more intents supported by the virtual agent 109, which can indicate that the virtual agent 109 is capable of fulfilling a request corresponding to the one or more intents. In some implementations, the registry data 123 can be queried using a intent as a key to access virtual agent records 126 that include matching registered intents 128.

The training data 124 can represent data used to train the natural language processor 118. The training data 124 can include intents, requests, and other data that can be used to train the natural language processor 118. When a new virtual agent 109 is registered with the registry engine 115, one or more registered intents 128 associated with that virtual agent 109 can be included in the training data 124. In some implementations, the training data 124 can be connected to one or more custom data sources that can be used to further refine the training data 124.

The user account(s) 125 can represent data regarding user accounts associated with one or more client devices 106. The user accounts 125 can be associated with users who have submitted requests that have been provided by a virtual agent 109 to the registry engine 115. Each of the user accounts 125 can include request data 129, redirect flag(s) 130, and potentially other data.

The request data 129 data can represent requests associated with a particular user account that have been made. The request data 129 can be representative of requests generated by the client device 106 and received from a virtual agent 109. For example, the request data 129 can include plaintext data representing requests generated by a user via a chat or messaging application, plaintext data representing requests generated by a user via a search engine, or other requests generated in or converted to a plaintext format. As another example, the request data 129 can include audio data representing a voice command generated by a user via a voice assistant.

The redirect flags 130 can indicate whether a request from a client device 106 associated with a particular user account 125 should be redirected. The redirect flag 130 can further indicate a virtual agent 109 to which requests associated with that user account 125 are to be redirected. A redirect flag 130 can be set by the registry engine 115 when a request is forwarded from one virtual agent 109 to a different virtual agent 109.

The client device 106 can be representative of one or more of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 133, such as liquid crystal displays (LCDs), gas plasma-based flat panel displays, organic light emitting diode (OLED) displays, electrophoretic ink ("E-ink") displays, projectors, or other types of display devices. In some instances, the display 133 can be a component of the client device 106 or can be connected to the client device 106 through a wired or wireless connection.

The client device 106 can be configured to execute various applications such as a client application 136 or other applications. The client application 136 can be executed in a client device 106 to access network content served up by the computing environment 103 or other servers, thereby rendering a user interface 139 on the display 133. To this end, the client application 136 can include a browser, a dedicated application, or other executable, and the user interface 139 can include a network page, an application screen, or other user mechanism for obtaining user input. The client device 106 can be configured to execute applications beyond the client application 136 such as email applications, social networking applications, word processors, spreadsheets, or other applications.

The client application 136 can receive requests from a user of the client device 106 and provide those requests to various virtual agents 109 hosted on respective virtual agent hosts 108. Requests can include commands and questions generated by the user of the client device 106. For example, a request can be a plaintext message, a search engine query, or a voice command. The request can be received via the user interface 139 or by an input device accessible to the client device 106, such as a microphone.

To provide a request to a virtual agent 109, for example, the client application 136 can, at the user's direction, access an application, webpage, widget, chat or messaging interface, or other approach for interacting with a particular virtual agent 109. The user can then input a request using the user interface 139, and the client application 136 can provide the request to the virtual agent 109. In some instances, the client application 136 can receive responses from various virtual agents 109. A response can include, for example, an indication that the user's request has been fulfilled, information that itself fulfills the user's request, or other information regarding the user's request. The client application 136 can allow the user to view the response by rendering a representation of the response in the user interface 139 on the display 133. In other instances, the client application 136 can receive from various virtual agents 109 error messages or other notifications indicating that requests could not be fulfilled.

Each of the virtual agent host(s) 108 can include one or more computing devices that can include a processor, a memory, and/or a network interface. For example, the virtual agent host 108 can be configured to perform computations on behalf of other computing devices or applications. As another example, the virtual agent host 108 can host and/or provide content to other computing devices in response to requests for content. In some implementations, though, the virtual agent host(s) 108 can be combined with the computing environment 103 or omitted, and the virtual agent(s) 109 can be implemented in and/or hosted by the computing environment 103.

Moreover, the virtual agent host 108 can employ a plurality of computing devices that can be arranged in one or more server banks or computer banks or other arrangements. Such computing devices can be located in a single installation or can be distributed among many different geographical locations. For example, the virtual agent host 108 can include a plurality of computing devices that together can include a hosted computing resource, a grid computing resource or any other distributed computing arrangement. In some cases, the virtual agent host 108 can correspond to an elastic computing resource where the allotted capacity of processing, network, storage, or other computing-related resources can vary over time.

The virtual agent host 108 can be configured to execute various applications such as the virtual agent 109 or other applications. The virtual agent 109 can be representative of a software agent capable of performing actions to fulfill requests made by users. The virtual agent 109 can include, for instance, a chat agent, a search engine, or a voice assistant.

The virtual agent 109 can be executed to receive and process requests received from the client device 106. The virtual agent 109 can process requests in a plaintext format or other format. If the format of the request is incompatible with the virtual agent 109, the virtual agent 109 can convert the request to a format that is compatible with the virtual agent 109. For example, if the request includes audio data associated with a voice command, the virtual agent 109 can convert the request to a plaintext format using suitable a speech-to-text converter. The speech-to-text conversion can be based at least in part on, for example, hidden Markov models, artificial neural networks, or dynamic time warping.

The virtual agent 109 can determine whether the virtual agent 109 is capable of fulfilling a request received from the client device 106. The virtual agent 109 can make this determination by, for example, identifying a supported intent 142 corresponding to the request. In some implementations, the virtual agent 109 can identify a user's intent underlying the request using suitable natural language processing functionality similar to that of the natural language processor 118. The virtual agent 109 may support the intent underlying the request when the underlying intent matches a supported intent 142—meaning that the supported intent 142 is consistent with what the user intended to accomplish in making the request. If so, the virtual agent 109 can fulfill the request by, for example, performing one or more actions associated with the request or the corresponding supported intent 142 and generating a response based at least in part on the one or more actions.

For example, if the request asks, "What is the weather in Athens?" the virtual agent 109 can determine that the intent underlying the request is for the user to be provided information regarding weather in the location "Athens" and that the underlying intent matches a supported intent 142. Once the virtual agent 109 retrieves this information, the virtual agent 109 can generate a response using this information. This response can, for example, notify the user that "The weather in Athens is 86° F. and sunny." Providing this response to the client device 106 can therefore fulfill the request.

As another example, if the request includes a command to "Change the status of ticket no. 2334531 to closed," the virtual agent 109 can determine that the intent underlying the request is changing a status of "ticket no. 2334531" and that the underlying intent matches a supported intent 142. The virtual agent 109 can then change the status of "ticket no. 2334531" to closed and generate a response. This response can, for example, notify the user that "Ticket no. 2334531 has been closed." The virtual agent 109 can then provide this response to the client device 106 to complete fulfillment of the request.

If the virtual agent 109 is incapable of fulfilling the request, however, the virtual agent 109 can provide the request to the registry engine 115. The virtual agent 109 can then receive from the registry engine 115 an identifier for another virtual agent 109 that is capable of fulfilling the request. The virtual agent 109 can provide that request to the other virtual agent 109. In some implementations, the virtual agent 109 can also provide a notification to the client device 106 to alert the user that the virtual agent 109 is incapable of fulfilling the request and/or that the other virtual agent 109 will be fulfilling the request.

In some implementations, the virtual agent 109 may provide the request to the other virtual agent 109 if a confidence score received from the registry engine 115 meets or exceeds a predefined threshold. If the confidence score for the other virtual agent 109 fails to meet or exceed the predefined threshold, however, the virtual agent 109 can provide the client device 106 with an error message, notification, or other indication that the request is unable to be fulfilled. In other implementations, if the virtual agent 109 receives identifiers for multiple other virtual agents 109 from the registry engine 115, then the virtual agent 109 can provide the request to one of these virtual agents 109 having a highest confidence score. In some implementations, the virtual agent 109 can also provide a notification to the client device 106 to alert the user that another virtual agent 109 will be fulfilling the request and provide an identifier for the other virtual agent 109.

In some implementations, if the other virtual agent 109 fulfills the request itself, the virtual agent 109 may not need to take any further action. In other implementations, though, the virtual agent 109 may receive a response to the request from the other virtual agent 109. The virtual agent 109 can then provide this response to the client device 106, thereby completing fulfillment of the request.

In some implementations, if the virtual agent 109 receives a request that the virtual agent 109 can fulfill from another virtual agent 109, the virtual agent 109 can perform an action associated with the request or a corresponding supported intent 142. The virtual agent 109 can then generate a response to the request that, when provided to the client device 106, can complete fulfillment of the request. The virtual agent 109 can then provide the response to the client device 106 to fulfill the request, or the virtual agent 109 can provide the response to the other virtual agent 109 or to the registry engine 115.

The supported intents 142 can be representative of one or more intents supported by the virtual agent 109. The supported intents 142 can be accessed by the virtual agent 109 to determine whether the virtual agent 109 can fulfill a request. For example, the virtual agent 109 can attempt to match an intent underlying the request—what the user intended to accomplish in making the request—with one or more supported intents 142. A supported intent 142 can match an underlying intent if the supported intent 142 would effectuate what the user intended to accomplish by making the request. If a matching supported intent 142 is found, then the virtual agent 109 can support that intent and therefore can fulfill the corresponding request.

Next, a general description of the operation of the various components of the network environment 100 is provided. Although the following description provides one example of the operation of and interaction between the various components of the network environment 100, it is understood that the various components can interact with each other in additional ways. A more detailed description of the operation of the individual components of the network environment 100 is provided in the paragraphs that accompany the description of FIGS. 2-4.

To begin, the client application 136 can receive a request from a user of the client device 106 and provide that request to a virtual agent 109. The request can include a command or a question generated by a user of the client device 106. The virtual agent 109 can, for example, be selected by the client application 136 at the user's direction. In some implementations, if the request is in a format that is incompatible with the virtual agent 109, the virtual agent 109 can convert the request to a format that is compatible with the virtual agent 109.

In some implementations, the virtual agent 109 can query the registry engine 115 to determine whether a redirect flag 130 has been set for a user who made the request. The registry engine 115 can check a user account 125 for that user to determine whether there is a redirect flag 130 set for that user account 125. If so, the registry engine 115 can provide an identifier for a virtual agent 109 indicated by the redirect flag 130 to the querying virtual agent 109. The querying virtual agent 109 can then provide the request to the virtual agent 109 associated with the redirect flag 130. If not, the virtual agent 109 can determine whether the virtual agent 109 is capable of fulfilling the request.

The virtual agent 109 can then determine whether the virtual agent 109 is capable of fulfilling the request. For example, the virtual agent 109 can determine whether the request corresponds to a supported intent 142 of the virtual agent 109. In some implementations, the virtual agent 109 can process the request using natural language processing functionality to determine the user's intent in making the request. A supported intent 142 can correspond to the request, and vice-versa, if the virtual agent 109 determines that the supported intent 142 is likely consistent with what the user intended to accomplish when making the request.

If the virtual agent 109 determines that request corresponds to a supported intent 142 of the virtual agent 109, then the virtual agent 109 can be capable of fulfilling the request. In that case, the virtual agent 109 can fulfill the request. For example, the virtual agent 109 can perform one or more actions to effectuate the supported intent 142, generate a response to the request, and provide that response to the client application 136.

If, however, the virtual agent 109 is unable to identify a supported intent 142 that corresponds to the request, then the virtual agent 109 can be incapable of fulfilling the request. The virtual agent 109 can then provide the request to the registry engine 115. That way, the registry engine 115 may determine whether another virtual agent 109 is capable of fulfilling the request.

Once the registry engine 115 receives the request, the registry engine 115 can provide the request to the natural language processor 118 to identify a registered intent 128 corresponding to the request. In some implementations, if the request is in a format that is incompatible with the natural language processor 118, the registry engine 115 can convert the request to a format that is compatible with the natural language processor 118 before providing the request to the natural language processor 118. The natural language processor 118 can attempt to match the request with one or more of the registered intents 128 stored in the registry data 123. The natural language processor 118 can do so by employing suitable natural language processing functionality to determine the request's underlying intent and comparing that underlying intent with the registered intents 128 in the registry data 123. A registered intent 128 can correspond to the request, and vice-versa, if the natural language processor 118 determines that the registered intent 128 is likely what the user intended to accomplish when making the request. The natural language processor 118 can return one or more identified registered intents 128 to the registry engine 115.

The natural language processor 118 can also calculate one or more confidence scores for the one or more registered intents 128. Each of the one or more confidence scores can represent a likelihood that the registered intent 128 matches the user's intent underlying the request. By extension, the confidence score can represent a likelihood that any virtual agents 109 that support the identified registered intent 128 are capable of fulfilling the request. The natural language processor 118 can return the one or more confidence scores to the registry engine 115.

The registry engine 115 can identify a virtual agent 109 that supports the identified registered intent 128. The registry engine 115 can use that registered intent 128 as a key to query the registry data 123. In return, the registry engine 115 can receive identifiers 127 for any virtual agents 109 associated with virtual agent records 126 that include the identified registered intent 128. In some implementations, the registry engine 115 can exclude from this identification any virtual agents 109 associated with registered intents 128 having confidence scores that fail to meet or exceed a predefined threshold.

In some implementations, the registry engine 115 can provide to the querying virtual agent 109 that originally sent the request an identifier 127 for the identified virtual agent 109. That way, the querying virtual agent 109 may provide the request to the identified virtual agent 109 so that the identified virtual agent 109 can fulfill the request. The registry engine 115 can, in some instances, also provide the confidence score for the registered intent 128 supported by the identified virtual agent 109. In other implementations, the registry engine 115 can provide the request directly to the identified virtual agent 109 instead of providing the request to the querying virtual agent 109.

The querying virtual agent 109 can receive the identifier 127 for the identified virtual agent 109 if it was provided by the registry engine 115. The querying virtual agent 109 can then provide the request to the identified virtual agent 109. If the querying virtual agent 109 also received a confidence score for the registered intent 128 supported by the identified virtual agent 109, the querying virtual agent 109 can, in some implementations, first determine whether the confidence score meets or exceeds a predefined threshold. The querying virtual agent 109 can provide the request to the identified virtual agent 109 if the confidence score meets or exceeds the predefined threshold.

After receiving the request, the identified virtual agent 109 can fulfill the request. For example, the virtual agent 109 can perform one or more actions to effectuate the supported intent 142 and generate a response to the request based the one or more actions. In some implementations, the identified virtual agent 109 can provide the response to the client application 136. This can complete fulfillment of the request. In other implementations, the identified virtual agent 109 can provide the response to the querying virtual agent 109. The querying virtual agent 109 can then provide the response to the client application 136 to complete fulfillment of the request.

Figure 2:
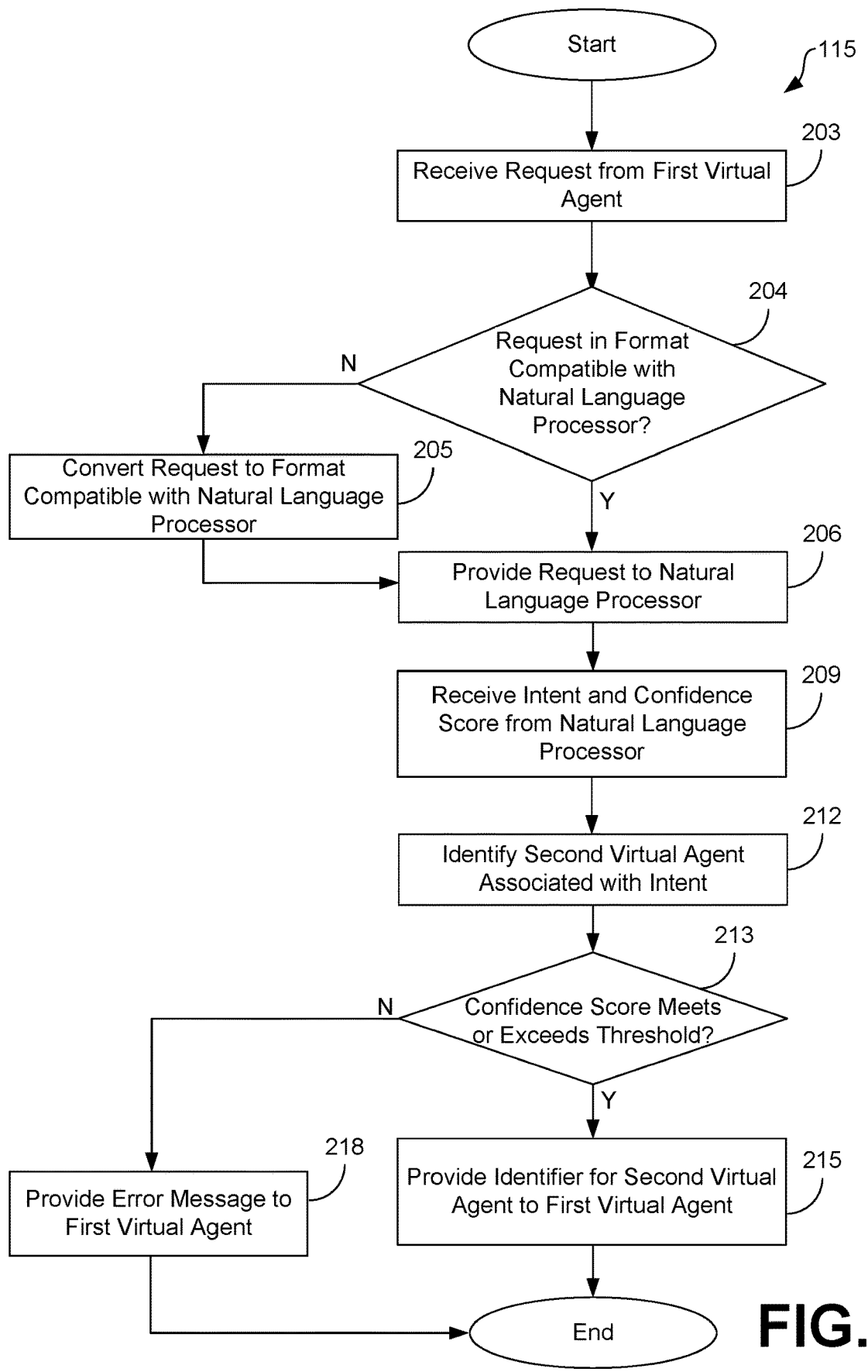
FIG. 2 shows a flowchart that provides one example of the operation of a portion of a registry engine in the network environment according to various embodiments of the present disclosure.

FIG. 2 shows a flowchart that provides one example of the operation of a portion of the registry engine 115. The flowchart of FIG. 2 provides merely an example of the many different types of functional arrangements that can be employed to implement the operation of the depicted portion of the registry engine 115. As an alternative, the flowchart of FIG. 2 can be viewed as depicting an example of elements of a method implemented within the network environment 100.

Beginning with block 203, the registry engine 115 can receive a request from a first virtual agent 109. The request can include a command or a question generated by a user of the client device 106. In some implementations, the registry engine 115 can receive the request from the first virtual agent 109 hosted on a first virtual agent host 108 via the network 112. The registry engine 115 can receive the request when the first virtual agent 109 determines that the first virtual agent 109 is unable to fulfill the request itself.

At block 204, the registry engine 115 can determine whether the request is in a format that is compatible with the natural language processor 118. For example, the registry engine 115 can determine whether the request is in a plaintext format, which the natural language processor 118 can be capable of processing. If the request is in a format that is incompatible with the natural language processor, the process can proceed to block 205. If the request is in a format that is compatible with the natural language processor 118, the process can proceed to block 206.

At block 205, if the request is a format that is incompatible with the natural language processor 118, the registry engine can convert the request into a format that is compatible with the natural language processor 118. For example, if the request includes audio data associated with a voice command, the virtual agent 109 can convert the request to a plaintext format using suitable speech-to-text converter. The speech-to-text conversion can be based at least in part on, for example, hidden Markov models, artificial neural networks, or dynamic time warping.

At block 206, the registry engine 115 can provide the request to the natural language processor 118. For example, the registry engine 115 can provide the request to the natural language processor by invoking a function call provided by an API of the natural language processor 118. As another example, the registry engine 115 can store the request in the request data 129 so that the natural language processor 118 can access the request data 129 to retrieve the request. This can allow the natural language processor 118 to parse the request to identify a registered intent 128.

At block 209, the registry engine 115 can receive from the natural language processor 118 an indication of a registered intent 128 corresponding to a request and a confidence score corresponding to the registered intent 128. The confidence score can represent a likelihood that the request matches the registered intent 128. The confidence score can therefore be used to determine whether there is a likelihood that the request matches the registered intent 128 sufficient to provide the request to a virtual agent 109 that supports that registered intent 128. The confidence score can be a value within a range of values, where a lower bound of this range indicates a certainty that the request fails to match the registered intent 128, and an upper bound indicates that a certainty that the request does match the intent. For example, the confidence score can include a percentage value, a numerical value between zero and one or other two boundaries, or another value that represents how well the request matches the registered intent 128.

At block 212, the registry engine 115 can identify a second virtual agent 109 associated with the registered intent 128. A virtual agent record 126 for the second virtual agent 109 can be identified from the registry data 123 as supporting the registered intent 128—and therefore being capable of fulfilling the request. For example, the registry engine 115 can query the registry data 123 using the registered intent 128 as a key. Identifiers for any virtual agents 109 associated with virtual agent records 126 that include the registered intent 128 can be returned from the registry data 123.

At block 213, the registry engine 115 can determine whether the confidence score corresponding to the registered intent 128 meets or exceeds a predefined threshold. The confidence score meeting or exceeding the predefined threshold can indicate that the likelihood that the second virtual agent 109 can fulfill the request is sufficient to provide the request to the second virtual agent 109, instead of notifying the user that the request cannot be fulfilled. For example, the registry engine 115 can determine whether the confidence score meets or exceeds a predefined threshold of ninety percent—indicating ninety percent likelihood that the request matches the registered intent 128—though any other percentage, numerical value, or other type threshold can be used. If the confidence score meets or exceeds the predefined threshold, the process can proceed to block 215. If the confidence score fails to meet or exceed the predefined threshold, the process can proceed to block 218.

At block 215, if the confidence score meets or exceeds the predefined threshold, the registry engine 115 can provide an identifier for the second virtual agent 109 to the first virtual agent 109. In some implementations, the registry engine 115 can first set a redirect flag 130 for a user account 125 of a user who made the request in the associated user account 125. For example, the registry engine 115 can set the redirect flag 130 to indicate that requests associated with the user account 125 of the user who made the request are to be redirected to the second virtual agent 109. Once the identifier for the second virtual agent 109 has been provided to the client device 106, the process can proceed to completion.

At block 218, if the confidence score fails to meet or exceed the predefined threshold, the registry engine 115 can provide an error message or other form of notification to the first virtual agent 109. The error message or other form of notification can notify the first virtual agent 109 that registry engine 115 failed to identify a virtual agent 109 that can fulfill the request. Once the error message or other notification has been provided to the client device 106, the process can proceed to completion.

Figure 3:
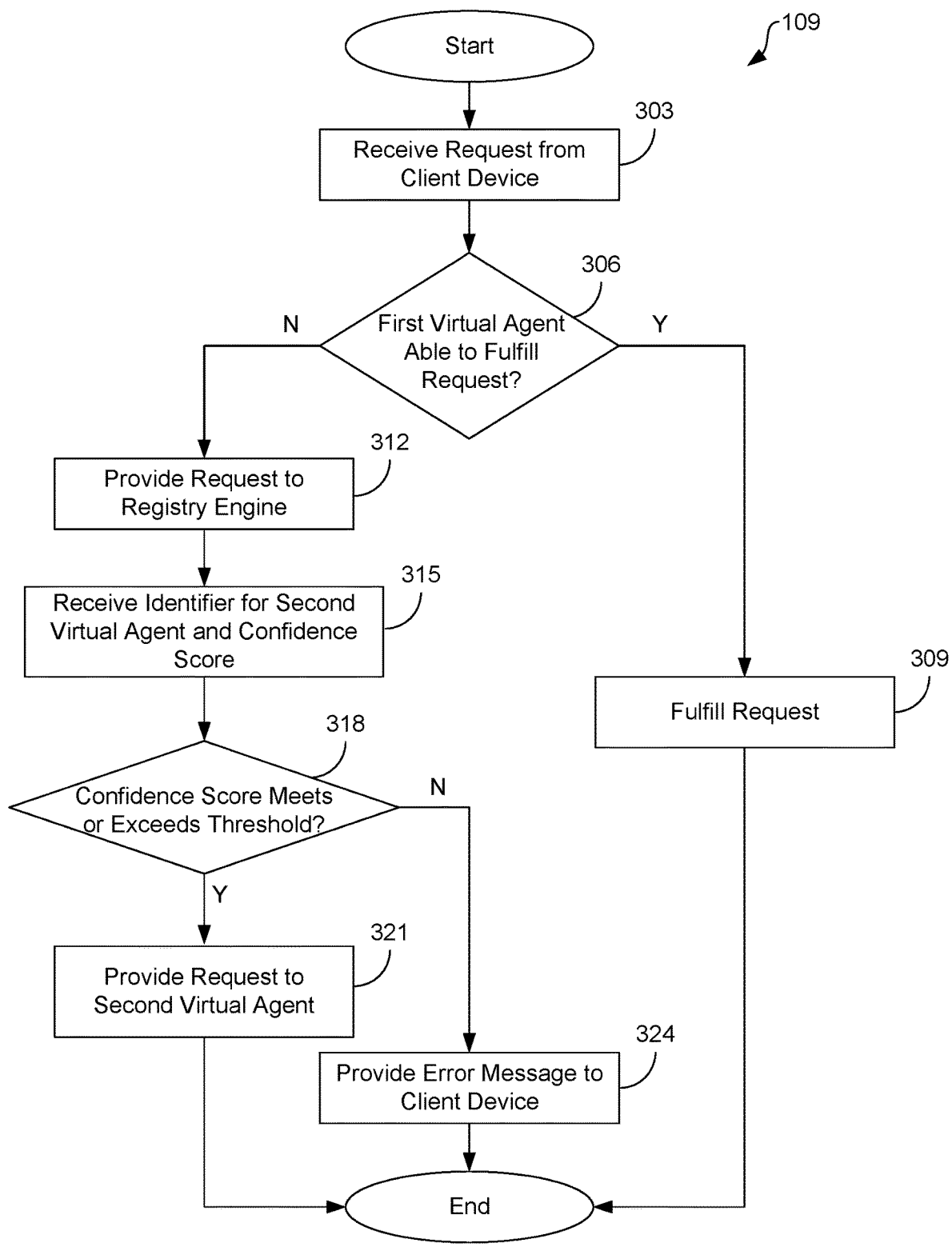
FIG. 3 shows a flowchart that provides one example of the operation of a portion of a first virtual agent in the network environment according to various embodiments of the present disclosure.

Referring next to FIG. 3, shown is a flowchart that provides one example of the operation of a portion of a first virtual agent 109. The flowchart of FIG. 3 provides merely an example of the many different types of functional arrangements that can be employed to implement the operation of the depicted portion of the first virtual agent 109. As an alternative, the flowchart of FIG. 3 can be viewed as depicting an example of elements of a method implemented within the network environment 100.

Beginning with block 303, the first virtual agent 109 can receive a request from a client device 106. If the request is in a format that is incompatible with the virtual agent 109, the virtual agent 109 can convert the request to a format that is compatible with the virtual agent 109. For example, if the request includes audio data associated with a voice command, the virtual agent 109 can convert the request to a plaintext format using suitable a speech-to-text converter. The speech-to-text conversion can be based at least in part on, for example, hidden Markov models, artificial neural networks, or dynamic time warping.

At block 306, the first virtual agent 109 can determine whether the first virtual agent 109 is capable of fulfilling the request. The first virtual agent 109 can make this determination by, for example, determining whether the request corresponds to a supported intent 142 of the first virtual agent 109. In some implementations, the first virtual agent 109 can identify an intent underlying the request using suitable natural language processing functionality similar to that of the natural language processor 118. The first virtual agent 109 can compare the underlying intent with the supported intents 142 to determine whether the underlying intent matches any of those supported intents 142. The first virtual agent 109 can be capable of fulfilling the request a matching supported intent 142 is found.

As an example, if the underlying intent is for the user to be provided information regarding the weather in a particular location, the first virtual agent 109 would be capable of fulfilling the request if the first virtual agent 109 if the first virtual agent 109 supports a supported intent 142 for retrieving weather data for the location. As another example, if the underlying intent is to change a status of a "ticket no. 2334531" to "closed," the first virtual agent 109 would be capable of fulfilling the request if the first virtual agent 109 supports a supported intent 142 for changing a status of "ticket no. 2334531." If the first virtual agent 109 is capable of fulfilling the request, the process can proceed to block 309. If the first virtual agent 109 is incapable of fulfilling the request, the process can proceed to block 312.

At block 309, if the first virtual agent 109 is capable of fulfilling the request, the first virtual agent 109 can fulfill the request. For example, the first virtual agent 109 can perform one or more actions associated with the request and/or the corresponding supported intent 142. The first virtual agent 109 can in some implementations generate a response to the request and provide that response to the client device 106.

For example, if the request asks, "What is the weather in Athens?", the first virtual agent 109 can perform an action to retrieve weather data for the location "Athens." Using the weather data, the first virtual agent 109 can generate a response indicating that "The weather in Athens is 86° F. and sunny." The first virtual agent 109 can then complete fulfillment of the request by providing the response to the client device 106.

As another example, if the request is a command to "Change the status of ticket no. 2334531 to closed," the first virtual agent 109 can perform an action to change a status of "ticket no. 2334531" to "closed." The first virtual agent 109 can then generate a response notifying the user that "Ticket no. 233531 has been closed." The first virtual agent 109 can then complete fulfillment of the request by providing the response to the client device 106. Once the request has been fulfilled, the process can proceed to completion.

At block 312, if the first virtual agent 109 is incapable of fulfilling the request, the first virtual agent 109 can provide the request to the registry engine 115. For example, the first virtual agent 109 could send the request to the registry engine 115 via the network 112. The first virtual agent 109 can provide the request to the registry engine 115 to allow the registry engine 115 to identify a virtual agent 109 that is capable of fulfilling the request according to the process described in FIG. 2. That way, the first virtual agent 109 can increase a likelihood that the request is fulfilled instead of informing the user that the request cannot be fulfilled.

At block 315, the first virtual agent 109 can receive from the registry engine 115 an identifier for a second virtual agent 109 and a confidence score for a registered intent 128 supported by the second virtual agent 109. The second virtual agent 109 may be one that was identified by the registry engine 115 as potentially supporting a registered intent 128 corresponding to the request according to the process discussed in FIG. 2. The second virtual agent 109 may therefore potentially be capable of fulfilling the request.

The confidence score can represent a likelihood that a registered intent 128 matches the request. If the registered intent 128 matches the request, then the registered intent 128 represents the user's intent underlying the request—that is, what the user intended to accomplish by making the request. The confidence score can be a value within a range of values, where a lower bound of this range indicates a certainty that the request fails to match the registered intent 128, and an upper bound indicates that a certainty that the request does match the registered intent 128. For example, the confidence score can include a percentage value, a numerical value between zero and one or other two boundaries, or another value that represents how well the request matches the registered intent 128.

At block 318, the first virtual agent 109 can determine whether the confidence score meets or exceeds a predefined threshold. The confidence score meeting or exceeding the predefined threshold can indicate that the likelihood that the second virtual agent 109 can fulfill the request is sufficient to provide the request to the second virtual agent 109, instead of notifying the user that the request cannot be fulfilled. For example, the registry engine 115 can determine whether the confidence score meets or exceeds a predefined threshold of ninety percent—indicating ninety percent likelihood that the request matches the registered intent 128—though any other percentage, numerical value, or other type threshold can be used. If the confidence score meets or exceeds the predefined threshold, the process can proceed to block 321. If the confidence score fails to meet or exceed the predefined threshold, the process can proceed to block 324.

At block 321, if the confidence score meets or exceeds the predefined threshold, the first virtual agent 109 can provide the request to the second virtual agent 109, which can be hosted on a second virtual agent host 108. In some implementations, the first virtual agent 109 can provide the request directly to the second virtual agent 109. In other implementations, however, the first virtual agent 109 can provide the request to the second virtual agent 109 indirectly by first providing the request to the registry engine 115, which can in turn provide the request to the second virtual agent 109. Once the first virtual agent 109 provides the request to the second virtual agent 109, the process can then proceed to completion.

At block 324, if the confidence score fails to meet or exceed the predefined threshold, the virtual agent 109 can provide an error message or other form of notification to the client device 106. The error message or other form of notification can notify the user that the request cannot be fulfilled. Once the error message or other notification has been provided to the client device 106, the process can proceed to completion.

Figure 4:
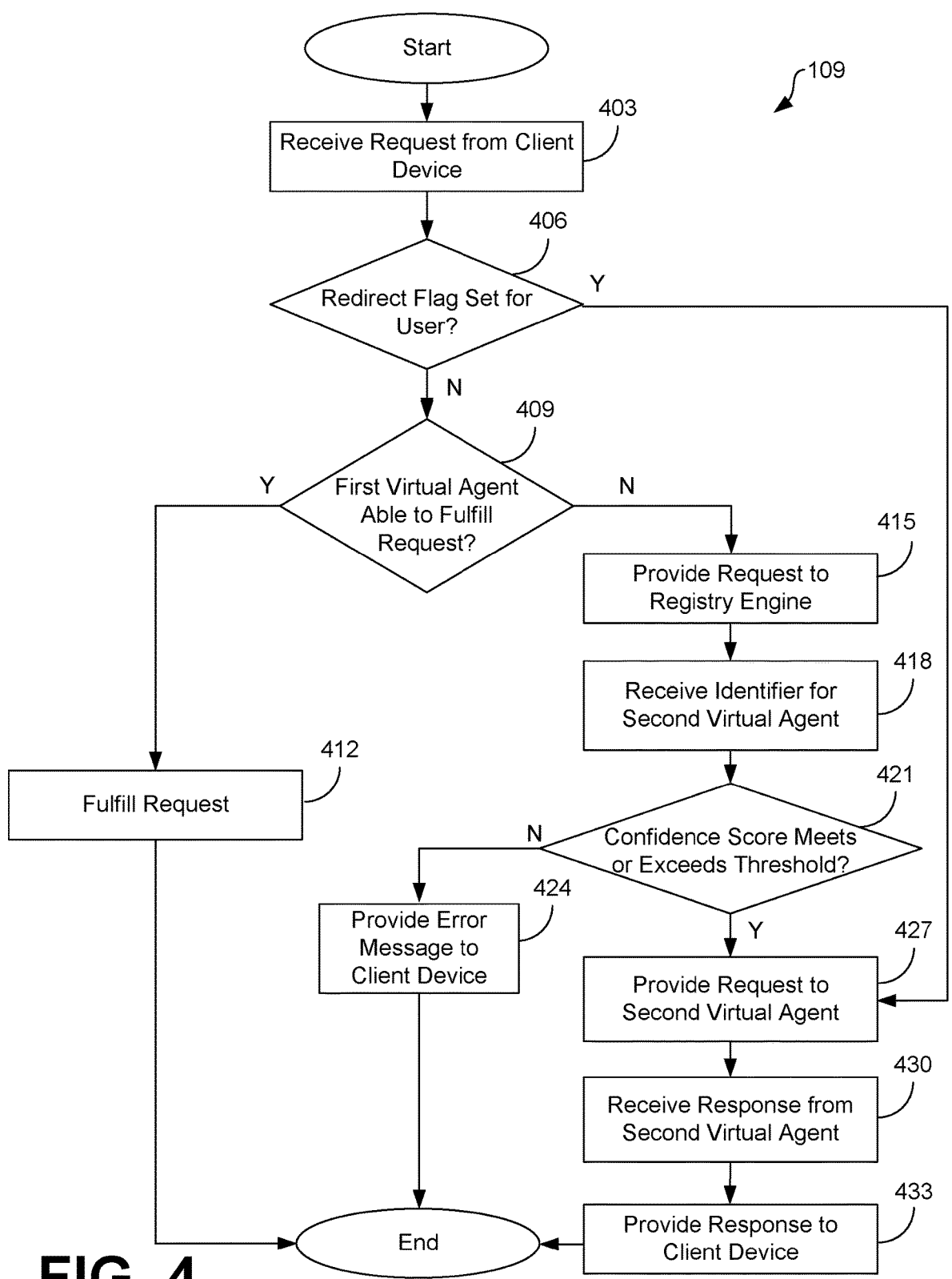
FIG. 4 shows a flowchart that provides one example of the operation of a portion of a first virtual agent in the network environment according to various embodiments of the present disclosure.

Referring next to FIG. 4, shown is a flowchart that provides one example of the operation of a portion of a first virtual agent 109. The flowchart of FIG. 4 provides merely an example of the many different types of functional arrangements that can be employed to implement the operation of the depicted portion of the first virtual agent 109. As an alternative, the flowchart of FIG. 4 can be viewed as depicting an example of elements of a method implemented within the network environment 100.

Beginning with block 403, the first virtual agent 109 can receive a request from a client device 106. If the request is in a format that is incompatible with the virtual agent 109, the virtual agent 109 can convert the request to a format that is compatible with the virtual agent 109. For example, if the request includes audio data associated with a voice command, the virtual agent 109 can convert the request to a plaintext format using suitable a speech-to-text converter. The speech-to-text conversion can be based at least in part on, for example, hidden Markov models, artificial neural networks, or dynamic time warping.

At block 406, the first virtual agent 109 can determine whether a redirect flag 130 is set for a user account associated with the client device 106. The redirect flag 130 can indicate whether the request should be provided to a second virtual agent 109 that can be indicated by the redirect flag 130. For example, the first virtual agent 109 can query the registry engine 115. The registry engine 115 can inform the first virtual agent 109 of whether a redirect flag 130 is set, and if so, to which virtual agent 109 the request is to be redirected. If the first virtual agent 109 determines that no redirect flag for the user is set, the process can proceed to block 409. If the first virtual agent 109 determines that a redirect flag is set for the user, the process can proceed to block 421.

At block 409, the first virtual agent 109 can determine whether the first virtual agent 109 is capable of fulfilling the request. The first virtual agent 109 can make this determination by, for example, determining whether the request corresponds to a supported intent 142 of the first virtual agent 109. In some implementations, the first virtual agent 109 can identify an intent underlying the request using suitable natural language processing functionality similar to that of the natural language processor 118. The first virtual agent 109 can compare the underlying intent with the supported intents 142 to determine whether the underlying intent matches any of those supported intents 142. The first virtual agent 109 can be capable of fulfilling the request a matching supported intent 142 is found.

As an example, if the underlying intent is for the user to be provided information regarding the weather in a particular location, the first virtual agent 109 can be capable of fulfilling the request if the first virtual agent 109 if the first virtual agent 109 supports a supported intent 142 for retrieving weather data for the location. As another example, if the underlying intent is to change a status of a "ticket no. 2334531" to "closed," the first virtual agent 109 can be capable of fulfilling the request if the first virtual agent 109 supports a supported intent 142 for changing a status of "ticket no. 2334531." If the first virtual agent 109 is capable of fulfilling the request, the process can proceed to block 412. If the first virtual agent 109 is incapable of fulfilling the request, the process can proceed to block 415.

At block 412, the first virtual agent 109 can fulfill the request if it has determined that it is capable of fulfilling the request. For example, the first virtual agent 109 can perform one or more actions associated with the request and/or the corresponding supported intent 142. The first virtual agent 109 can, in some implementations, generate a response to the request and provide that response to the client device 106.

For example, if the request asks, "What is the weather in Athens?", the first virtual agent 109 can perform an action to retrieve weather data for the location "Athens." Using the weather data, the first virtual agent 109 can generate a response indicating that "The weather in Athens is 86° F. and sunny." The first virtual agent 109 can then complete fulfillment of the request by providing the response to the client device 106.

As another example, if the request is a command to "Change the status of ticket no. 2334531 to closed," the first virtual agent 109 can perform an action to change a status of "ticket no. 2334531" to "closed." The first virtual agent 109 can then generate a response notifying the user that "Ticket no. 233531 has been closed." The first virtual agent 109 can then complete fulfillment of the request by providing the response to the client device 106. Once the request has been fulfilled, the process can proceed to completion.

At block 415, if the first virtual agent 109 is incapable of fulfilling the request, the first virtual agent 109 can provide the request to the registry engine 115 via the network 112. The first virtual agent 109 can provide the request to the registry engine 115 to allow the registry engine 115 to identify a virtual agent 109 that is capable of fulfilling the request according to the process described in FIG. 2. That way, the first virtual agent 109 can increase a likelihood that the request is fulfilled instead of informing the user that the request cannot be fulfilled.

At block 418, the first virtual agent 109 can receive from the registry engine 115 an identifier for a second virtual agent 109 and a confidence score for a registered intent 128 supported by the second virtual agent 109. The second virtual agent 109 may be one that was identified by the registry engine 115 as potentially supporting a registered intent 128 corresponding to the request according to the process discussed in FIG. 2. The second virtual agent 109 may therefore potentially be capable of fulfilling the request.

The confidence score can represent a likelihood that a registered intent 128 matches the request. If the registered intent 128 matches the request, then the registered intent 128 represents the user's intent underlying the request—that is, what the user intended to accomplish by making the request. The confidence score can be a value within a range of values, where a lower bound of this range indicates a certainty that the request fails to match the registered intent 128, and an upper bound indicates that a certainty that the request does match the registered intent 128. For example, the confidence score can include a percentage value, a numerical value between zero and one or other two boundaries, or another value that represents how well the request matches the registered intent 128.

At block 421, the first virtual agent 109 can determine whether the confidence score meets or exceeds a predefined threshold. The confidence score meeting or exceeding the predefined threshold can indicate that the likelihood that the second virtual agent 109 can fulfill the request is sufficient to provide the request to the second virtual agent 109, instead of notifying the user that the request cannot be fulfilled. For example, the registry engine 115 can determine whether the confidence score meets or exceeds a predefined threshold of ninety percent—indicating ninety percent likelihood that the request matches the registered intent 128—though any other percentage, numerical value, or other type threshold can be used. If the confidence score fails to meet or exceed the predefined threshold, the process can proceed to block 424. If the confidence score meets or exceeds the predefined threshold, the process can proceed to block 427.

At block 424, if the confidence score fails to meet or exceed the predefined threshold, the virtual agent 109 can provide an error message or other form of notification to the client device 106. The error message or other form of notification can notify the user that the request cannot be fulfilled. Once the error message or other notification has been provided to the client device 106, the process can proceed to completion.

At block 427, if the confidence score meets or exceeds the predefined threshold, the first virtual agent 109 can provide the request to the second virtual agent 109. In some examples, the second virtual agent 109 could have been identified at block 406 based at least in part on a redirect flag set for the user, indicating that the request is to be redirected to the second virtual agent 109. In other examples, the second virtual agent 109 could have been identified as associated with the intent based at least in part on receiving an identifier for the second virtual agent from the registry engine 115 at block 412. In some implementations the, first virtual agent 109 can provide the request directly to the second virtual agent 109. In other implementations, however, the first virtual agent 109 can provide the request to the second virtual agent 109 indirectly by first providing the request to the registry engine 115, which can provide the request to the second virtual agent 109.

At block 430, the first virtual agent 109 can receive a response from the second virtual agent 109. Fulfillment of the request can be completed when the response is provided to the client device 106.

In some implementations, the response can inform the user that an action has been performed that effectuates the registered intent 128 corresponding to the request. For example, if the request is a command to "Change the status of ticket no. 2334531 to closed," the second virtual agent 109 could have performed an action to change a status of "ticket no. 2334531" to "closed." The response can then be a message notifying the user that "Ticket no. 233531 has been closed," which can complete fulfillment of the request.

In other implementations, the response can include information that itself effectuates the registered intent 128 corresponding to the request. For example, if the request asks, "What is the weather in Athens?" the second virtual agent 109 could have retrieved weather data for the location "Athens" and generated a response using this data. This response can therefore notify the user that "The weather in Athens is 86° F. and sunny," as an example. Providing this response to the client device 106 can complete fulfillment the request.

At block 433, the first virtual agent 109 can provide the response to the client device 106. As discussed above, providing the response to the client device 106 can complete fulfillment of the request. Once the request has been fulfilled, process can proceed to completion.

Figure 5A:
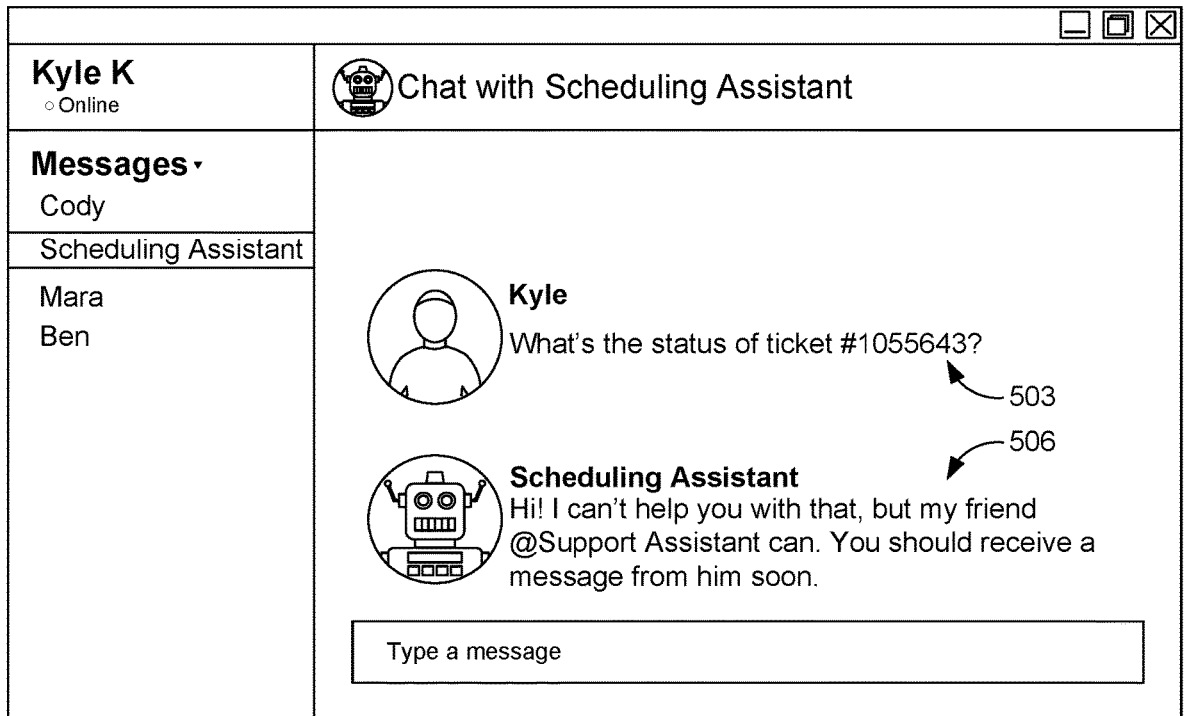
FIGS. 5A-B show examples of user interfaces rendered by a client application in a display of a client device in the network environment according to various embodiments of the present disclosure.
Figure 5B:
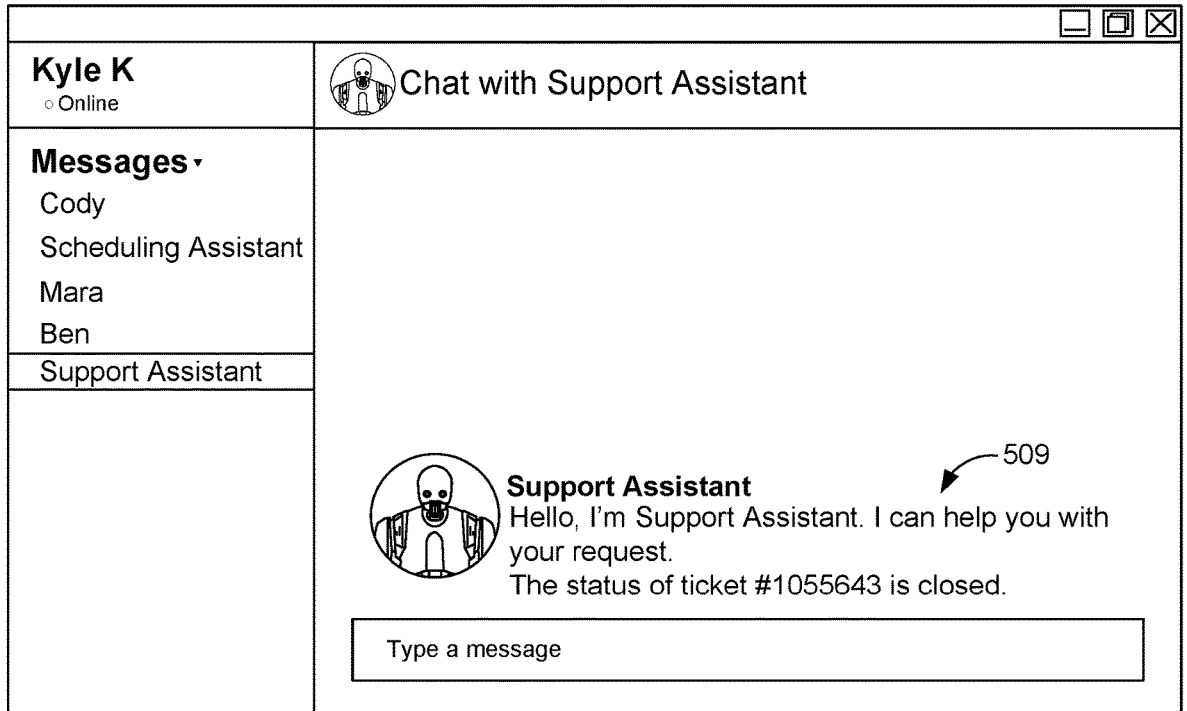

Turning to FIGS. 5A and 5B, shown are examples of user interfaces 139 rendered by the client application 136 in the display 133 of the client device 106 according to various embodiments of the present disclosure. The user interfaces 139 in FIGS. 5A and 5B show examples of a user interacting with various virtual agents 109 to fulfill a request. The examples of FIGS. 5A and 5B illustrate in part processes according to FIGS. 2 and 3.

The example of FIG. 5A depicts an example of a user interface 139 that includes a request 503 from a user presented to a first virtual agent 109. A notification 506 from the first virtual agent 109 is also presented to the user in reply to the request 503. The notification 506 alerts the user that the first virtual agent 109 is unable to fulfill the request 503 and that a second virtual agent 109 will be fulfilling the request instead.

The example of FIG. 5B depicts an example of a user interface 139 that includes a response 509 from the second virtual agent 109 presented to the user. The response 509 was generated by the second virtual agent 109 to fulfill the request 503. The request was provided to the second virtual agent 109 by the first virtual agent 109 once it was determined that the first virtual agent 109 fails to support a registered intent 128 corresponding to the request and that the second virtual agent 109 likely does support this registered intent 128.

Figure 6:
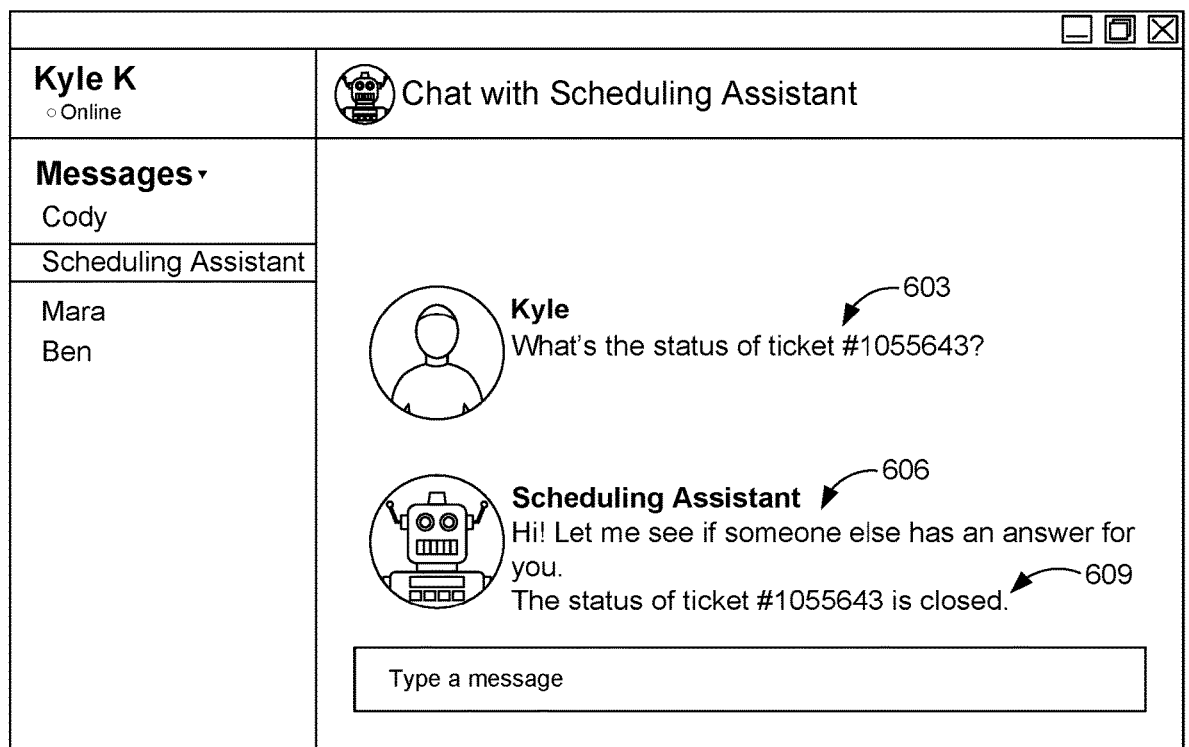
FIG. 6 shows another example of a user interface rendered by a client application in a display of a client device in the network environment according to various embodiments of the present disclosure.

Referring next to FIG. 6, shown is another example of a user interface 139 rendered by the client application 136 in the display 133 of the client device 106 according to various embodiments of the present disclosure. The user interface 139 in FIG. 6 shows and example of a user interacting with a virtual agent 109 to fulfill a request. The example of FIG. 6 illustrates in part processes according to FIGS. 2 and 4.

In the example of FIG. 6, the user interface 139 includes a request 603 from a user presented to a first virtual agent 109 and a notification 606 from the first virtual agent 109. The notification 606 can alert the user that the first virtual agent 109 is attempting to locate a second virtual agent 109 that is capable of fulfilling the request 603. This can likewise indicate that the first virtual agent 109 is incapable of fulfilling the request.

The user interface 139 also includes a response 609 presented to the user to complete fulfillment the request. While the response 609 is from the first virtual agent 109, the response 609 was generated by the second virtual agent 109. Because the first virtual agent 109 was incapable of fulfilling the request 603, the request 603 was provided to the second virtual agent 109, which was capable of fulfilling the request. The second virtual agent 109 therefore generated the response 609 to fulfill the request 603 and provided it to the first virtual agent 109 for presentation to the user.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 2-4 a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIGS. 2-4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   receive a request from a first virtual agent;
   determine an intent corresponding to the request;
   identify a second virtual agent associated with the intent by causing the computing device to at least:
   send the request to a natural language processing service to determine the intent, wherein the natural language processing service is configured to:
   calculate a respective confidence score for respective ones of a plurality of registered intents, the respective confidence score representing a likelihood that the request matches the respective ones of the plurality of registered intents, wherein individual registered intents represent intents supported by a virtual agent; and
   return the respective confidence score; and
   determine, based at least in part on the respective confidence score, that the intent corresponding to the request is unsupported by the first virtual agent and is associated with the second virtual agent;
   provide to the first virtual agent an identifier for the second virtual agent; and
   set a redirect flag corresponding to a user account associated with the request in response to providing to the first virtual agent the identifier for the second virtual agent.

2. The system of claim 1, wherein the machine-readable instructions, when executed, further cause the computing device to at least provide the request to the second virtual agent.

3. The system of claim 1, wherein the machine-readable instructions that cause the computing device to provide to the first virtual agent an identifier for the second virtual agent further cause the computing device to at least provide to the first virtual agent the identifier for the second virtual agent in response to the confidence score meeting or exceeding a predefined threshold.

4. The system of claim 1 wherein the machine-readable instructions, when executed, further cause the computing device to at least provide the confidence score to the first virtual agent.

5. The system of claim 1, wherein the second virtual agent is identified from a registry comprising a plurality of virtual agents, individual virtual agents of the plurality of virtual agents being associated with at least one respective intent.

6. The system of claim 5, wherein the machine-readable instructions, when executed, further cause the computing device to at least:
   receive an indication of at least one intent associated with a third virtual agent;
   determine that registry fails to include the third virtual agent;
   register the third virtual agent in the registry; and
   associate the third virtual agent with the at least one intent.

7. The system of claim 1, wherein the machine-readable instructions that cause the computing device to at least determine, based at least in part on the respective confidence score, that the intent corresponding to the request is unsupported by the first virtual agent and is associated with the second virtual agent further cause the computing device to at least determine whether the confidence score meets or exceeds a predefined threshold.

8. A method, comprising:
   receiving, by a first computing device, a request from a client device associated with a user account;
   determining, by the first computing device, an inability of a first virtual agent to fulfill the by:
   sending the request to a natural language processing service to determine an intent, wherein the natural language processing service is configured to:
   calculate a respective confidence score for respective ones of a plurality of registered intents, the respective confidence score representing a likelihood that the request matches the respective ones of the plurality of registered intents, wherein individual registered intents represent intents supported by a virtual agent; and
   return the respective confidence score; and
   determining, based at least in part on the respective confidence score, that the intent corresponding to the request is unsupported by the first virtual agent and is associated with the second virtual agent;
   providing, by the first computing device, the request to the second virtual agent in response to determining that the confidence score meets or exceeds the predefined threshold; and
   providing, by the first computing device, a notification to the client device, the notification comprising an indication that the request is being referred to the second virtual agent.

9. The method of claim 8, wherein the confidence score comprises a representation of a likelihood that an intent corresponding to the request matches an intent associated with the second virtual agent.

10. The method of claim 8, wherein the request is a first request and the method further comprises:
    receiving, by the first computing device, a second request from a third virtual agent; and
    performing, by the first computing device, an action associated with the second request.

11. The method of claim 10, further comprising:
    generating, by the first computing device, a response based at least in part on the second request; and providing, by the first computing device, the response to the client device.

12. The method of claim 8, wherein determining, based at least in part on the respective confidence score, that the intent corresponding to the request is unsupported by the first virtual agent and is associated with the second virtual agent further comprises determining, by the first computing device, whether the confidence score meets or exceeds a predefined threshold.

13. A system, comprising:
a computing device comprising a processor and a memory; and
machine-readable instructions stored in the memory that, when executed by the processor, cause the computing device to at least:
receive a request from a client device associated with a user account;
determine that an intent corresponding to the request is unsupported by a first virtual and that the intent is associated with a second virtual agent by causing the computing device to at least:
send the request to a natural language processing service to determine the intent, wherein the natural language processing service is configured to:
calculate a respective confidence score for respective ones of a plurality of registered intents, the respective confidence score representing a likelihood that the request matches the respective ones of the plurality of registered intents, wherein individual registered intents represent intents supported by a virtual agent; and
return the respective confidence score; and
determine, based at least in part on the respective confidence score, that the intent corresponding to the request is unsupported by the first virtual agent and is associated with the second virtual agent;
determine whether to redirect the request to the second virtual agent based at least in part on a flag associated with the user account;
redirect the request to the second virtual agent;

receive a response from the second virtual agent; and
provide the response to the client device.

14. The system of claim 13, wherein the machine-readable instructions, when executed by the processor, further cause the computing device to at least set the flag associated with the user account in response to a determination that the intent is associated with the second virtual agent.

15. The system of claim 13, wherein the request is a first request, and the machine-readable instructions, when executed by the processor, further cause the computing device to at least:
receive a second request from the client device;
determine that a second intent corresponding to the second request is unsupported by the first virtual agent;
determine whether to redirect the second request based at least in part on the flag associated with the user account; and
redirect the second request to the second virtual agent.

16. The system of claim 13, wherein the machine-readable instructions that cause the computing device to determine that the intent is associated with a virtual agent further cause the computing device to at least provide a query to a registry comprising a plurality of virtual agents, the query comprising the intent.

17. The system of claim 13, wherein the request comprises a plaintext message.

18. The system of claim 13, wherein the request comprises a voice command and the machine-readable instructions, when executed by the processor, further cause the computing device to at least convert the voice command into a plaintext command.

19. The system of claim 13, wherein the machine-readable instructions that cause the computing device to at least determine, based at least in part on the respective confidence score, that the intent corresponding to the request is unsupported by the first virtual agent and is associated with the second virtual agent further cause the computing device to at least determine whether the confidence score meets or exceeds a predefined threshold.

* * * * *